Oct. 8, 1957  A. G. HERON  2,809,268
FLEXIBLE ELECTRICALLY HEATED HOSES
Filed June 18, 1956

Inventor
Andrew George Heron
By Alexander Howell
Attorneys

United States Patent Office 2,809,268
Patented Oct. 8, 1957

2,809,268
FLEXIBLE ELECTRICALLY HEATED HOSES

Andrew George Heron, Benton, Newcastle-upon-Tyne, England

Application June 18, 1956, Serial No. 592,100

3 Claims. (Cl. 219—46)

This invention relates to flexible electrically heated hoses of the kind comprising an electric heating conductor incorporated in the body of the hose and used for heating fluids e. g., liquids, passing through the hose.

The main object of the invention is to provide a form of such hose which may be heated to a higher temperature (say 200° C. to 300° C.) than is practical with those forms of hose hitherto made. Another object is to provide means for preventing a drop in the temperature of the heated fluid as it discharges from the hose, for example heated liquid being supplied to a spraying gun, so that the fluidity of the liquid may be maintained.

It has been proposed to form an electrically heated flexible hose in which the conductor was constituted by the well known type of metal tubing consisting in a channel section helix in which the adjacent sides of the channel section of successive convolutions interengage to form a fluid-tight joint. However, owing to the relative movement which takes place along the contact surfaces of the channel section on every movement of the hose, the resistance of the tubing is constantly varying, so that it is not possible to ensure a uniform heat being generated along the length of the tubing.

According to the invention, the electric heating conductor consists in a continuous length of laterally annularly or helically corrugated metal tubing which is capable of flexing without affecting its electrical resistance.

The return conductor may be combined with the tubular heating conductor by enclosing the latter in a protective sheath of heat and electric insulant, such as asbestos or glass fibre or other heat insulant, and arranging on this sheath the return conductor which may take the form of braided wire which may be in the form of a sleeve, a wire helix, or a linear conductor. When such return conductor is of linear form, it may very conveniently comprise a flat strip of braided metal wire encased in a covering of heat and electric insulant such as bonded glass fibre, the covering being bonded to the protective sheath.

Where the hose is to be used for spraying, the return conductor may be embodied with the air hose and may, for example, be in the form of braided wire (e. g. braided wire sleeve) a wire helix or a linear conductor.

In all the above forms of heating hose, an outer armoured protecting sheath may be arranged around the hose.

The invention will now be described with reference to the accompanying drawings which show in perspective partly in section, the two end portions of a form of hose in which the heating and return conductors are incorporated in a single hose, adapted for use with a spraying gun.

Referring more particularly to the drawings, 1 is a continuous length of laterally corrugated flexible tubing of bronze or copper of concertina or bellows form, and is the heating conductor. 2 is a layer of heating and electrical insulant such as asbestos, glass cloth or silicone rubber, which is applied to the outside of the metal tubing 1. Spaced from the end of the hose is the end of a return conductor 3 which is in the form of a braided copper sleeve. This sleeve is pressed over the outside of the insulation 2. 4 is an outer cover of heat insulant of synthetic rubber such as P. C. P.

Figure 1:
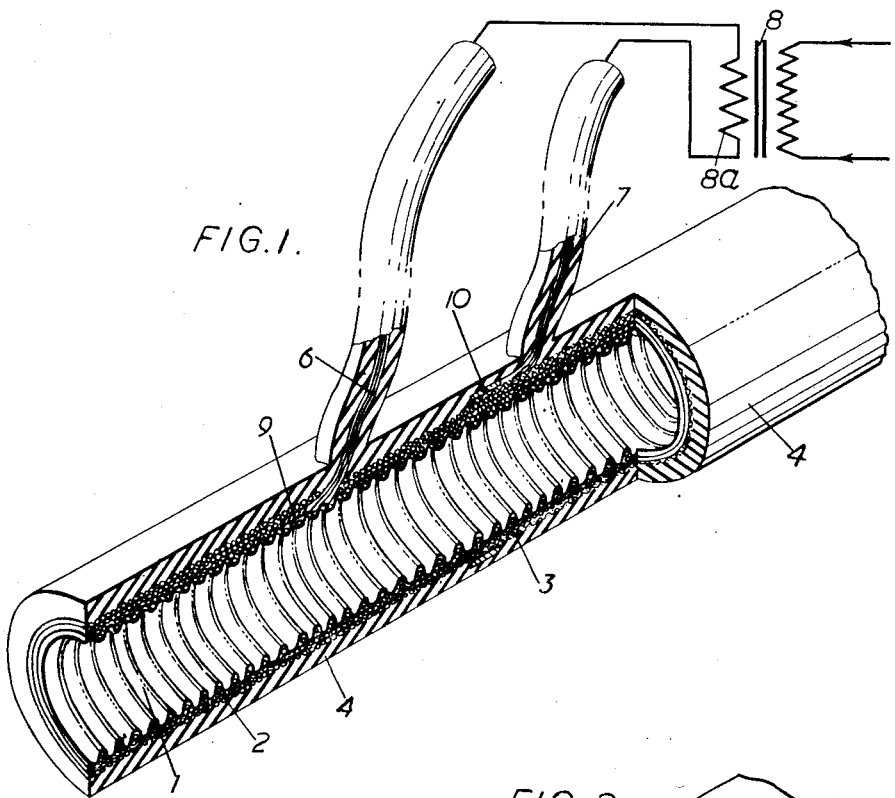
Fig. 1 is the end of the hose adjacent the supply, for example the secondary winding of a step-down transformer.
Figure 2:
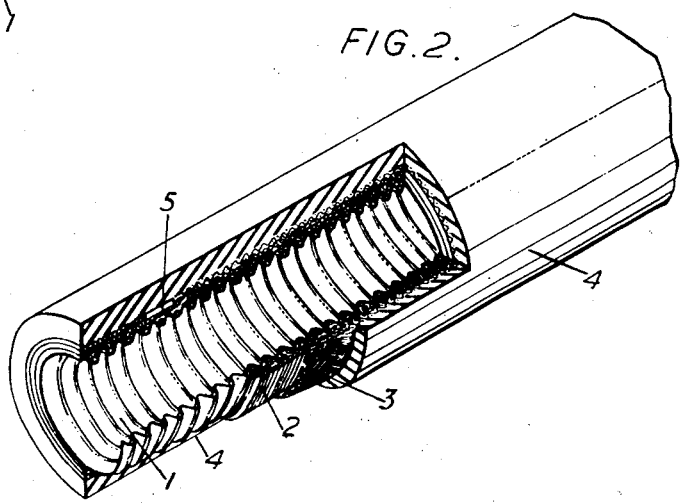
Fig. 2 shows the other end of the hose where the ends of the two conductors are connected.

At the remote end of the hose, as shown in Fig. 2, the tubing 1 and the copper braiding 3 are bonded together along an annular metallic band 5; while at the other end of the hose, as shown in Fig. 1, flexible tails or leads 6, 7 adapted to be connected to the secondary winding 8a of a step-down transformer 8 are bonded respectively at 9, and 10 to the tube 1 and braiding 3.

I claim:

1. A flexible electrically heated hose comprising an electric heating conductor consisting of an uninterrupted length of metallic tubing which has been laterally corrugated to render it flexible, a flexible electric and heat insulating covering surrounding the said tubing, an electric return conductor in the form of a braided metallic sheath around said insulating covering and bonded at one end to the said tubing near one end thereof, and means for making electrical connections respectively to those ends of the said tubing and braided sheath remote from the said connected ends thereof.

2. A flexible electrically heated hose according to claim 1 wherein the said braided sleeve is enclosed in a protective electrical and heat insulating flexible material.

3. A flexible electrically heated hose comprising an electric heating conductor consisting of an uninterrupted length of metallic tubing which has been laterally corrugated to render it flexible, a flexible electric and heat insulating covering surrounding the said tubing, an electric return conductor in the form of a flat strip of braided metal wire encased in a covering of heat and electric insulating material and bonded at one end to the said tubing near one end thereof, and means for making electrical connections respectively to those ends of the said tubing and braided strip remote from the said connected ends thereof.

References Cited in the file of this patent
UNITED STATES PATENTS

| | | |
|---|---|---|
| 1,575,152 | Di Battista | Mar. 2, 1926 |
| 1,792,352 | Bassiere | Feb. 10, 1931 |
| 2,135,775 | Walker | Nov. 8, 1938 |
| 2,274,839 | Marick | Mar. 3, 1942 |
| 2,451,839 | Lemon | Oct. 19, 1948 |
| 2,516,864 | Gilmore et al. | Aug. 1, 1950 |
| 2,758,194 | Heron | Aug. 7, 1956 |